US011568030B1

(12) United States Patent
Mandia et al.

(10) Patent No.: US 11,568,030 B1
(45) Date of Patent: Jan. 31, 2023

(54) PHONE NUMBER BASED APPLICATION AUTHENTICATION

(71) Applicant: Snap Inc., Santa Monica, CA (US)

(72) Inventors: Patrick Mandia, Venice, CA (US); Charles Burson DePue, Topanga, CA (US); David Whyte, Toronto (CA); Matthew Colin Grantham, Toronto (CA)

(73) Assignee: Snap Inc., Santa Monica, CA (US)

( * ) Notice: Subject to any disclaimer, the term of this patent is extended or adjusted under 35 U.S.C. 154(b) by 336 days.

(21) Appl. No.: 16/803,235

(22) Filed: Feb. 27, 2020

Related U.S. Application Data

(60) Provisional application No. 62/908,366, filed on Sep. 30, 2019.

(51) Int. Cl.
G06F 21/00 (2013.01)
H04L 29/06 (2006.01)
G06F 21/31 (2013.01)
H04L 51/046 (2022.01)
G06F 21/44 (2013.01)
H04L 51/58 (2022.01)

(52) U.S. Cl.
CPC .............. G06F 21/31 (2013.01); G06F 21/44 (2013.01); H04L 51/046 (2013.01); H04L 51/58 (2022.05)

(58) Field of Classification Search
CPC ....... G06F 21/31; G06F 21/44; H04L 51/046; H04L 51/38
See application file for complete search history.

(56) References Cited

U.S. PATENT DOCUMENTS

| 11,263,667 | B1* | 3/2022 | Rastogi | G06F 16/9535 |
| 2008/0306951 | A1* | 12/2008 | Rodefer | H04L 67/38 |
| | | | | 707/999.009 |
| 2016/0006868 | A1* | 1/2016 | Zhang | H04M 3/436 |
| | | | | 455/415 |
| 2017/0295119 | A1* | 10/2017 | Rosenberg | G06Q 30/0643 |
| 2018/0183777 | A1* | 6/2018 | Guillory | H04L 63/061 |
| 2018/0337907 | A1* | 11/2018 | Bhansali | G06F 21/32 |
| 2019/0020905 | A1* | 1/2019 | Bennett | H04N 5/77 |
| 2019/0180278 | A1* | 6/2019 | Park | H04W 12/72 |
| 2019/0349741 | A1* | 11/2019 | Bellam | H04L 63/104 |

* cited by examiner

Primary Examiner — Philip J Chea
Assistant Examiner — Rodman Alexander Mahmoudi
(74) Attorney, Agent, or Firm — Schwegman Lundberg & Woessner, P.A.

(57) ABSTRACT

Systems and methods are provided for registering with a given application. The systems and methods include operations for receiving, with a messaging application, a request to authenticate a phone number from the given application, the phone number being input by a user to register an account with the given application; determining that the phone number received in the request matches a user phone number stored in a user account associated with the messaging application; in response to determining that the phone number received in the request matches the user phone number stored in the user account, transmitting a communication from the messaging application to the given application indicating that the phone number has been authenticated; and causing the given application to register the account for the user to enable the user to log into the given application.

20 Claims, 11 Drawing Sheets

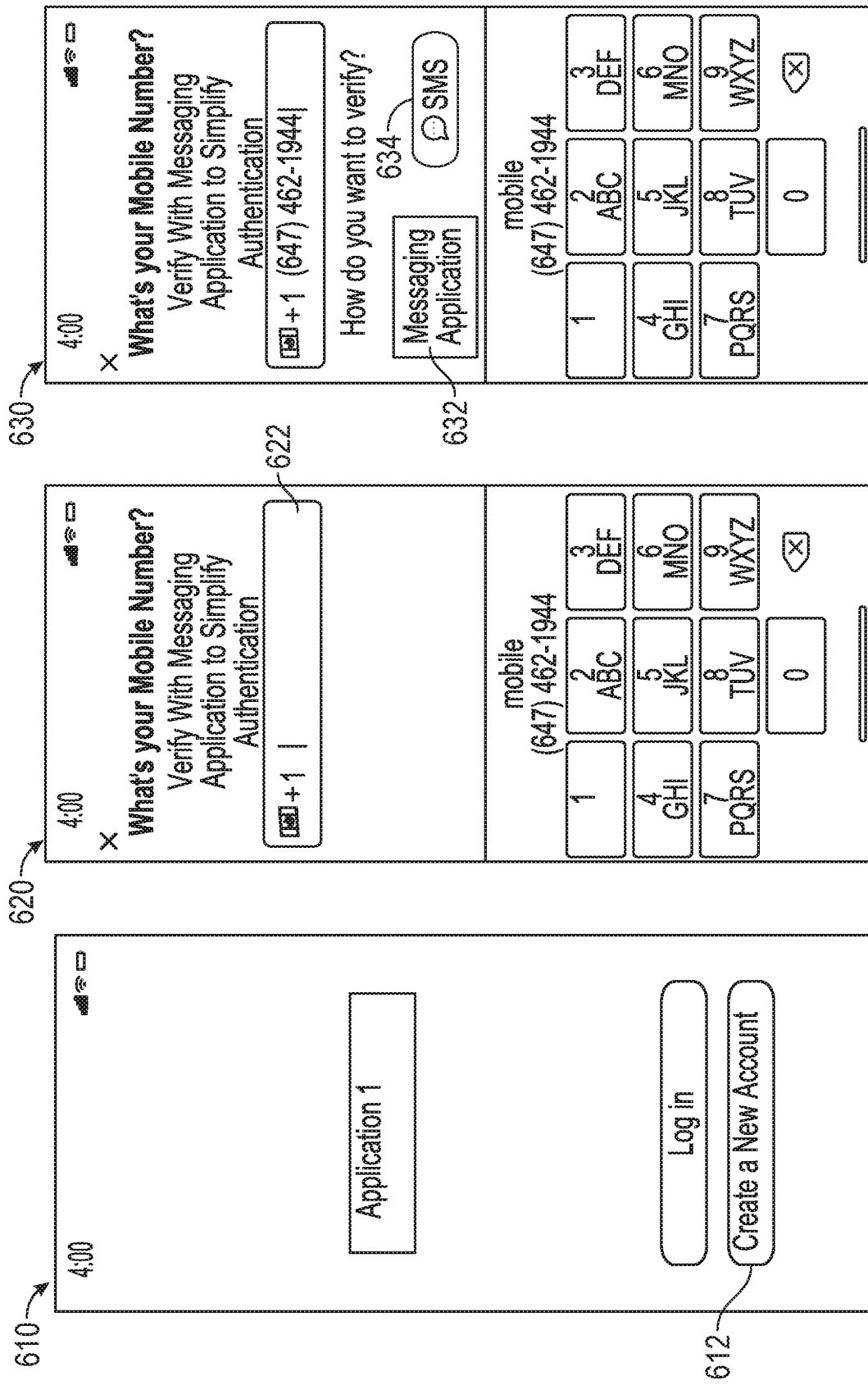

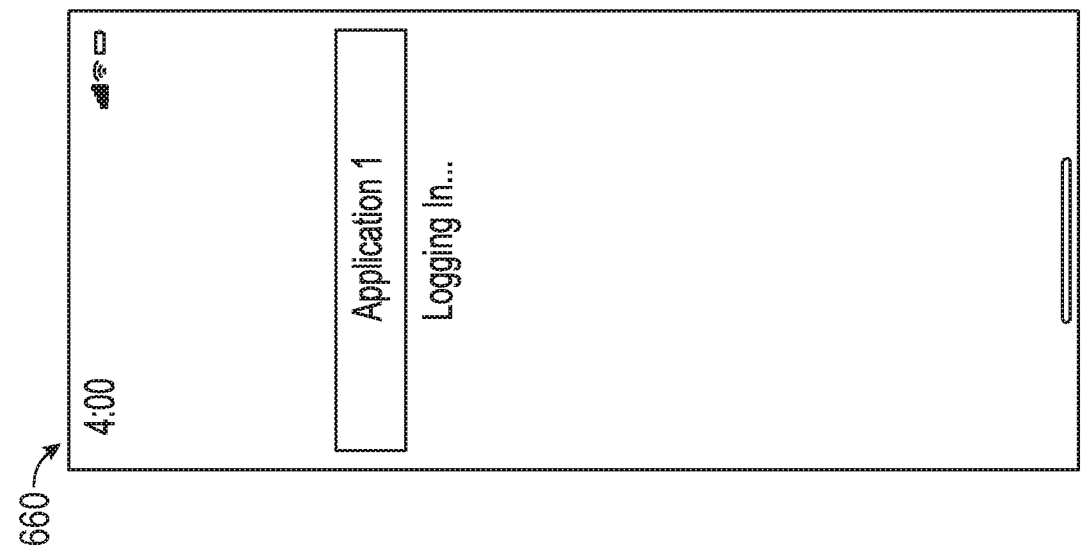
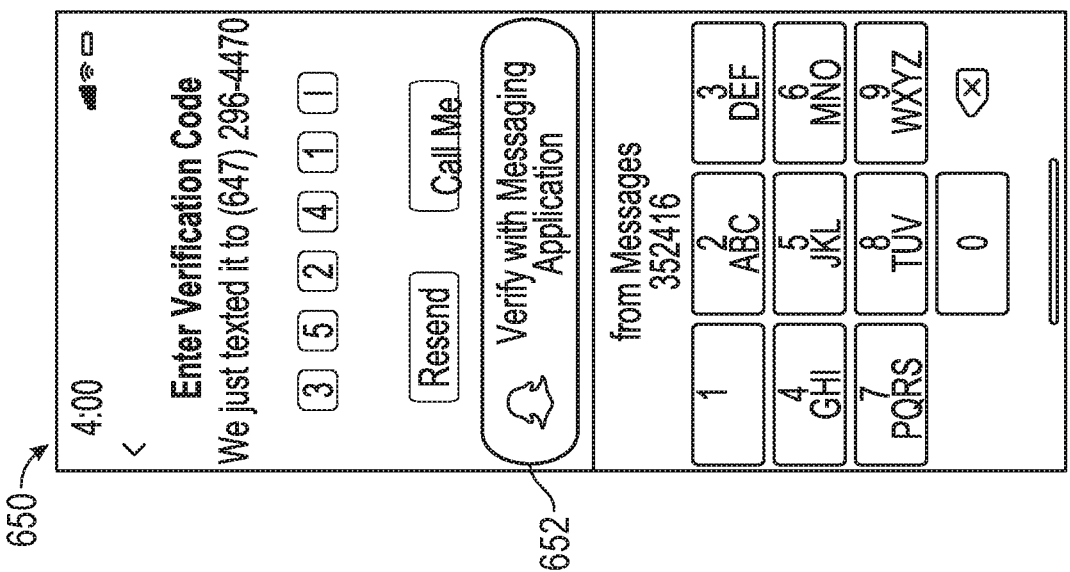
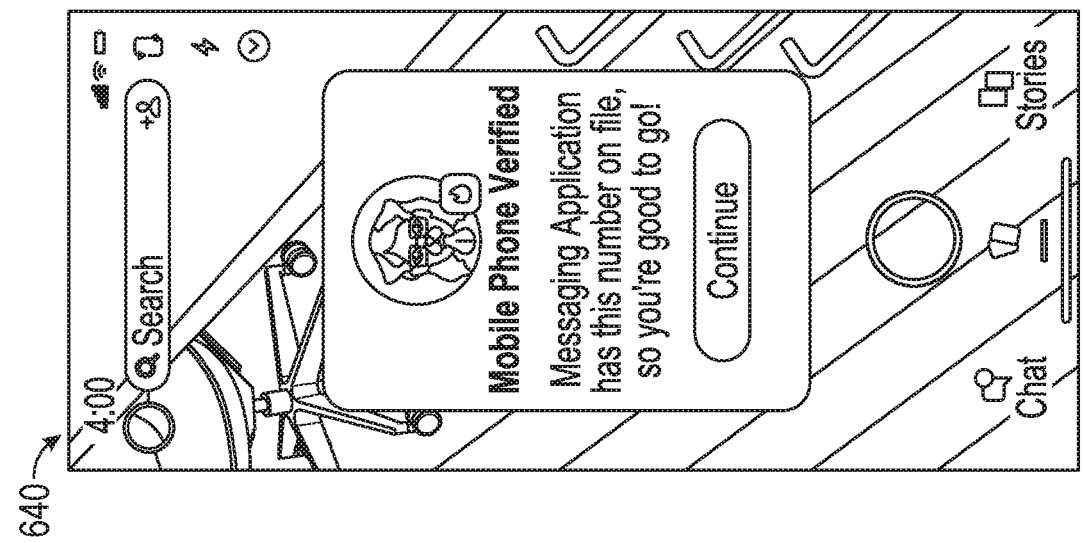

US 11,568,030 B1

PHONE NUMBER BASED APPLICATION AUTHENTICATION

CROSS-REFERENCE TO RELATED APPLICATION

This application claims the benefit of priority of U.S. Provisional Patent Application No. 62/908,366, entitled "PHONE NUMBER BASED APPLICATION AUTHENTICATION," filed on Sep. 30, 2019, the entirety of which is hereby incorporated by reference herein.

TECHNICAL FIELD

The present disclosure relates generally to authenticating applications using a messaging application.

BACKGROUND

Modern day user devices implement multiple applications on a given device. Users typically maintain specific accounts for each application. As such, to access a given application, the users input the credentials associated with the account for the given application. After the credentials are authenticated, the user can access various features of the given application. Typically, such credentials involve a username and password.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which:

FIGS. 6A-F, 7A-C and 8 are illustrative inputs and outputs of the phone based authentication system, according to example embodiments.

DETAILED DESCRIPTION

Figure 1:
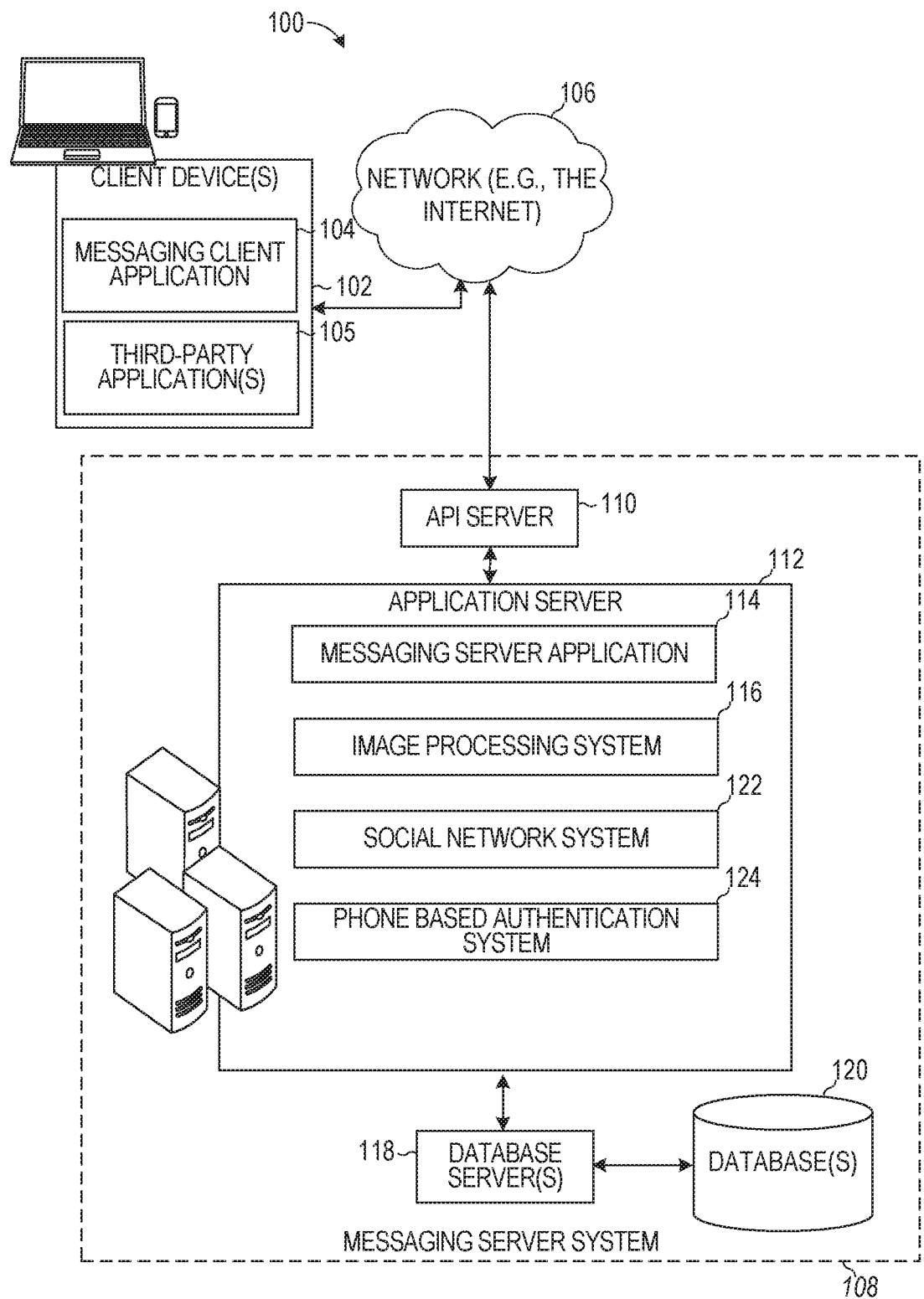
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, users maintain unique accounts for each application that is installed on their devices. To access a given application, the user has to recall their login credentials and input those credentials into the interface of the given application. After the application validates the credentials, the user gains access to the features of the application. Because of the increasing number of applications users install on their devices, remembering the credentials for each application becomes incredibly burdensome and can be discouraging to users. Sometimes users even write down their credentials for each application, which jeopardizes the user's security if those written down credentials are lost or stolen.

In some instances, a user can access a given application using their account from another application. To do so, the user launches the desired application and instructs the application to retrieve the user's account credentials from another application. While this approach works well in reducing the number of credentials the user has to remember, users often forget which applications are sharing the user's account. This can subject the user to security risks if security of one of the applications has been compromised and the user does not remember if the user previously authorized sharing of the user's account with that particular application. In addition, such approaches require the user to launch each given application individually to determine whether that application is configured to share the user's account from another application. This process of figuring out which applications are configured to share the user's account is extremely tedious and time consuming for the users and results in a waste of resources or lack of use.

The disclosed embodiments improve the efficiency of using the electronic device by providing a phone based authentication system that simplifies the way in which users log into applications. Specifically, according to the disclosed embodiments, a user can log into a given application using just a phone number without having to input other credentials, such as a username and password. The phone number that is input to the given application is transmitted to a messaging application via an Application Programming Interface (API) of the messaging application. The messaging application searches the list of phone numbers (stored in one or more user accounts) to determine whether the received phone number has been previously registered with the messaging application. In response to determining that the received phone number matches one of the previously registered phone numbers, the messaging application transmits a communication to the given application indicating that the phone number has been authenticated. As a result, the given application is caused to register an account for the user to allow the user to log into the given application with the phone number that was input by the user without requesting other login credentials from the user. To maintain the user's privacy, the phone numbers stored by the messaging application are not shared with any other application. The messaging application may only receive a phone number that is input and verify whether the phone number is associated with a stored user account. The messaging application does not provide access to reveal the phone numbers stored by the messaging application.

In some embodiments, the messaging application presents a graphical user interface with a prompt indicating to the user that the phone number received in the request to authenticate the phone number has been found. This prompt is presented in response to determining that the phone number received matches the user phone number stored in the user account. Via the graphical user interface, the user can proceed to authorize the given application to register an account for the user. In some implementations, the prompt provides an option for the user to select to connect the given application with the messaging application. In response to receiving a user selection of the option to connect the given application with the messaging application, the messaging application provides the given application with access to profile information, such as a user's avatar, a list of the user's friends, and media content items stored on the messaging application server. In an embodiment, selection of the option to connect causes the given application to share authentication information with the messaging application based on an OAUTH 2 authorization framework.

In some embodiments, the messaging application maintains a list of applications that have been connected with the messaging application. The user can request to display a list of the connected applications in the messaging application graphical user interface. In an embodiment, the messaging application determines which ones of the connected applications have an account registered using the phone number. The messaging application visually distinguishes applications in the list of connected applications for which an account was registered using the phone number from those for which an account was not registered using a phone number.

In some embodiments, in response to receiving the request to authenticate the user or register an account for the user with the given application using a phone number, the messaging application determines whether the user is currently logged into the messaging application. If the user is logged into the messaging application, the messaging application proceeds to determine whether the input phone number matches a phone number stored in the user account. In some implementations, if the user is not currently logged into the messaging application, the messaging application stores the request to authenticate the user's phone number until the user logs into the messaging application.

In some embodiments, the given application transmits the request to authenticate the user's phone number in response to receiving a user selection of an option to authenticate the user's phone number with the messaging application. Specifically, the user requests on the user device to launch the given application. The given application determines whether or not the user has an account with the given application. If the user does not currently have an account with the given application, the given application presents a graphical user interface with an option that allows the user to register an account using just the user's phone number. In response to the user selecting the option to register the account using the phone number, the graphical user interface presents a text region for inputting a phone number. The text region may be country specific such that the number of phone number digits the user can input is based on the number of digits in a phone number in the specific country. After the user inputs the phone number, the user can select between authenticating the phone number using a text message code or using the messaging application. If the user selects to authenticate using the messaging application, the given application transmits the phone number to the messaging application with a request to authenticate the phone number through an API of the messaging application. In some embodiments, the option to authenticate the phone number using the messaging application is excluded from display in response to the given application determining that the messaging application is not currently installed on the user device.

In some embodiments, the messaging application determines that the phone number received from the given application to authenticate fails to match a phone number stored in a user account of the messaging application. In response, the messaging application presents a prompt with an option for the user to add the phone number to the account stored by the messaging application. In response to receiving a user selection of the option to add the phone number, the messaging application authenticates the phone number by transmitting a code via text message or phone call to the phone number and requesting that the user input the code via a graphical user interface of the messaging application. If the code input via the graphical user interface matches the code sent via the text message, the phone number is associated with the user account of the messaging application and the messaging application transmits the communication to the given application indicating that the phone number has been authenticated.

In this way, the disclosed embodiments improve the efficiency of using the electronic device by reducing the number of screens and interfaces a user has to navigate through to log into a given application by simply entering a phone number. This enhances the security of the user's credentials and logging into applications. This also reduces the device resources (e.g., processor cycles, memory, and power usage) needed to accomplish a task with the device. The disclosed embodiments particularly enhance the security of the user's credentials by having a single point or server, that the user trusts, control and maintain the user's credentials, which are used to verify authenticity of the user's phone number. The connected application can be a third-party application that is provided by an entity or organization that differs from the entity or organization that provides the messaging application.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and between a messaging client application 104 and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access a phone based authentication system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using different login credentials than the messaging client application 104. Namely, the third-party application 105 can maintain a first user account and the messaging client application 104 can maintain a second user account. In an embodiment, the third-party application 105 can be accessed by the client device 102 by inputting a user's phone number and without inputting other credentials (e.g., a username and password). After a phone number is input to the third-party application 105 and verified for authenticity with the messaging client application 104, the third-party application 105 registers an account for the user and allows the user to access the third-party application 105 without inputting other credentials.

As an example, the third-party application 105 can be a social networking application, a dating application, a ride or car sharing application, a shopping application, a trading application, a gaming application, an imaging application, or any other suitable application. In some embodiments, the third-party application 105 is configured to share authentication information with the messaging client application 104. For example, the third-party application 105 can share authentication information with the messaging client application 104 based on the OAuth 2 flow framework. To do so, the messaging client application 104 communicates an authentication token to an authentication server. The authentication token may include information from a user account with the messaging client application 104. The authentication token may uniquely identify the third-party application 105 and may be associated with an expiration time. The third-party application 105 communicates with the authentication server to obtain the authentication token. Using the information contained in the authentication token (e.g., a username, a password, a user address, and so forth), the third-party application 105 is able to provide the user access to features of the third-party application 105. Namely, a user can launch the third-party application 105 and, in response, the third-party application 105 communicates with the authentication server to determine whether the third-party application 105 has a valid token for the user. If the expiration time specified in the token has not yet been reached, the third-party application 105 retrieves the token and logs the user into the third-party application 105 using the information contained in the token. If the expiration time has been reached or exceeded, the third-party application 105 can request that the messaging client application 104 renew the token to extend the expiration time. If the messaging client application 104 renews the token, the third-party application 105 automatically logs the user into the third-party application 105 and enables the user to access the features of the third-party application 105.

In some embodiments, the user requests on the user device to launch the third-party application 105, such as by selecting a corresponding icon on a graphical user interface presented by the user device. The third-party application 105 determines whether or not the user has an account with the third-party application 105. If the user does not currently have an account with the third-party application 105, the third-party application 105 presents a graphical user interface with an option that allows the user to register an account using just the user's phone number. In response to the user selecting the option to register the account using the phone number, the graphical user interface presents a text region for inputting a phone number. The text region may be country specific such that the number of phone number digits the user can input is based on the number of digits in a phone number in the specific country. After the user inputs the phone number, the user can select between authenticating the phone number using a text message code or using the messaging client application 104. If the user selects to authenticate using the messaging client application 104, the third-party application 105 transmits the phone number to the messaging client application 104 with a request to authenticate the phone number through an API of the messaging client application 104. In some embodiments, the option to authenticate the phone number using the messaging client application 104 is excluded from display in response to the third-party application 105 determining that the messaging client application 104 is not currently installed on the user device.

In some embodiments, the messaging client application 104 receives the request from the third-party application 105 either directly from the third-party application 105 or via a server of the messaging client application 104. The request may include the phone number input by the user and an identifier of the third-party application 105. The messaging client application 104 accesses a user account for the user that is logged into the messaging client application 104 and retrieves a phone number stored in the user account. The messaging client application 104 compares the phone number received in the request with the phone number stored in the retrieved account. In response to determining that the phone numbers match, the messaging client application 104 transmits a communication to the third-party application 105 indicating that the phone number is authorized or authenticated. In some embodiments, the messaging client application 104 searches a list of all the phone numbers previously provided to the messaging client application 104 by one or more users. The messaging client application 104 compares the phone number received in the request with the phone numbers in the list. In response to determining that the phone number in the request matches one of the phone numbers on the list, the messaging client application 104 transmits a communication to the third-party application 105 indicating that the phone number is authorized or authenticated.

In some embodiments, in response to determining that the received phone number matches the phone number in the user's account with the messaging client application 104 (or when the phone number matches one of the phone numbers in the list of phone numbers), the messaging client application 104 presents an option to the user for connecting the messaging client application 104 with the third-party application 105.

In some embodiments, the messaging client application 104 presents a graphical user interface that allows the user to view applications (e.g., connected applications including third-party applications 105) that have been previously authorized by the messaging client application 104 to share the authentication information from the messaging client application 104. The graphical user interface may include an option for each application that allows the user to instruct the messaging client application 104 to discontinue sharing the authentication information. In response to the user selecting the option to discontinue sharing the authentication information, the messaging client application 104 sends, to the authentication server, the specific identity of the third-party application 105 that is associated with the selected option and an indication to expire or revoke the token for that application. At a later point, the user can select an option to re-connect the application that has been disconnected, at which time the messaging client application 104 communicates to the authentication server the specific identity of the third-party application 105 that is associated with the selected option to re-connect and an indication to renew the token for that application. In some embodiments, the messaging client application 104 visually distinguishes a first set of applications in the list of connected applications that have been registered using a phone number from a second set of applications in the list of connected applications that have not been registered using the phone number.

In some embodiments, features of the messaging client application 104 are selectively enabled based on whether a given third-party application 105 has been connected to the messaging client application 104. For example, a feature to share media items with other applications can be in a disabled state when the given third-party application 105 has not yet been connected to the messaging client application 104. In response to the user selecting an option to share authentication information with the third-party application 105, the feature to share media items with other applications, and particularly with the third-party application 105, becomes enabled. The user can select and interact with the feature to automatically transmit to the third-party application 105 any media items that are captured, stored, and manipulated by the messaging client application 104. The third-party application 105, once connected, is configured to use an API of the messaging client application 104 to display or playback any of the media items that have been transmitted and shared with the third-party application 105 by the messaging client application 104. Namely, the media items may be configured to only be played using a video or image player (decoder) of the messaging client application 104, and the API enables the third-party application 105 to access the player of the messaging client application 104 to play the media items. In this way, because playback of the media items by the third-party application 105 is controlled by the API of the messaging client application 104, the messaging client application 104 can compute metrics or a view count for each media item even when such a media item is played or accessed by the third-party application 105 outside of the messaging client application 104. Specifically, a given media item may be transmitted and shared by the messaging client application 104 with first and second third-party applications 105. If such a media item is played 100 times by users of a first third-party application 105 and 200 times by users of a second third-party application 105 through the API of the messaging client application 104, the messaging client application 104 can track and determine that the view count of the particular media item is 300, even though the media item was accessed by the first and second third-party applications 105.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., images or video) from a messaging client application 104 to the messaging server application 114, for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the phone based authentication system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the phone based authentication system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The phone based authentication system 124 manages authentication of third-party applications 105 using phone numbers. In some embodiments, the phone based authentication system 124 manages the authentication sharing in accordance with the OAuth 2 flow framework. The phone based authentication system 124 communicates with the third-party application 105 to receive a phone number input by a user to register an account with the third-party application 105. The phone based authentication system 124 determines whether the phone number input by the user matches a phone number previously verified or authenticated by the phone based authentication system 124. If the phone number matches one of the phone numbers previously verified or authenticated, the phone based authentication system 124 transmits a communication to the third-party application 105 to enable a user of the client device 102 to access the third-party application 105 without creating a specific account with the third-party application 105 and/or inputting credentials to log into the third-party application 105.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated and hosted by a second, different entity. In some implementations, database 120 stores user data that the first entity collects about various each of the users of a service provided by the first entity. For example, the user data includes user names, phone numbers, passwords, addresses, friends, activity information, preferences, videos or content consumed by the user, and so forth.

Figure 2:
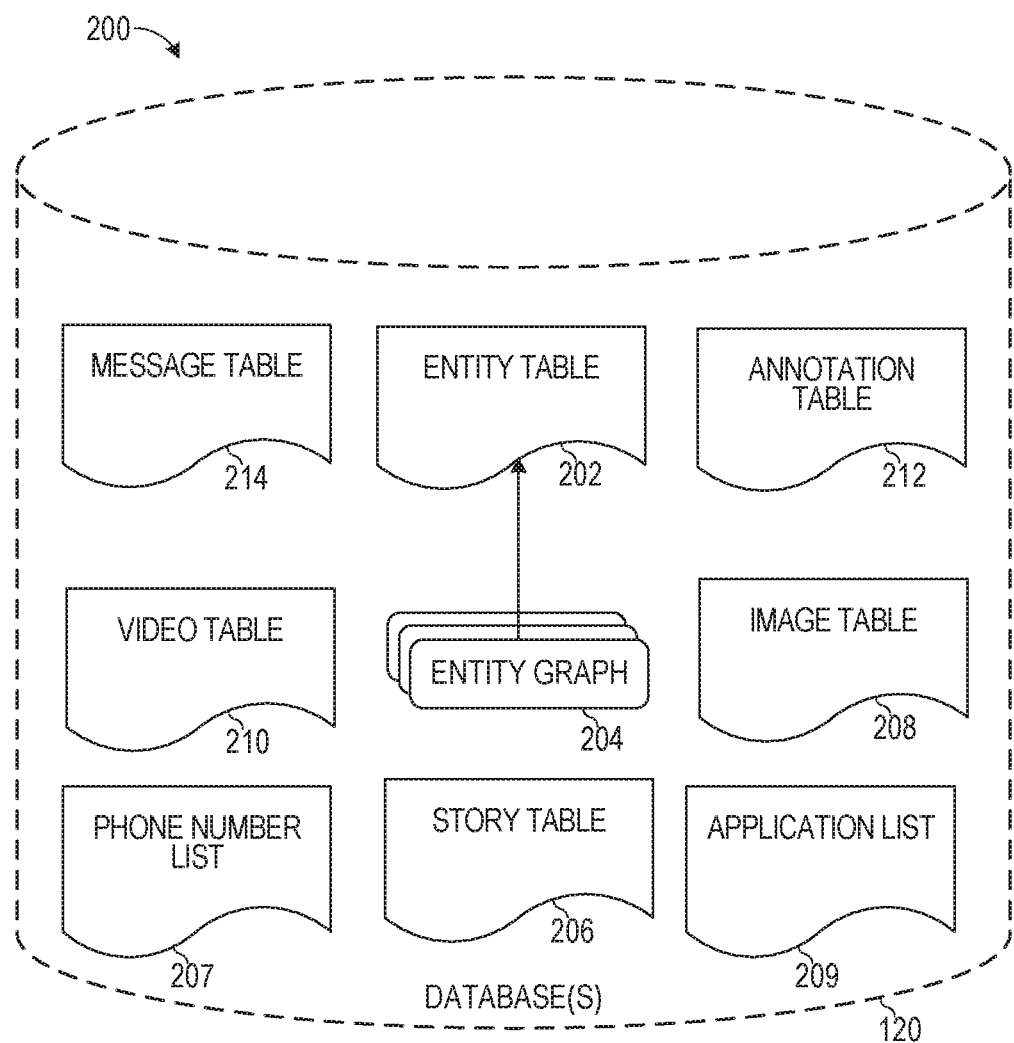
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Phone number list 207 stores previously collected data about a plurality of users of the application server 112 including phone numbers for the users. Specifically, a user of the messaging client application 104 may authenticate a phone number with the messaging client application 104. To do so, the user accesses and logs into the messaging client application 104 on a client device 102. The user inputs their phone number and selects an option to authenticate using text messaging or a phone call. In response to selecting the option to authenticate using text messaging, the phone based authentication system 124 transmits a code via text message to the phone number that is input by the user. The phone based authentication system 124 presents a graphical user interface with a text entry region requesting that the user input the code that was transmitted via text message to the phone number. The user inputs the code and the phone based authentication system 124 compares the code that was transmitted via text message with the code input by the user. In response to the phone based authentication system 124 determining that the codes match, the phone based authentication system 124 determines that the phone number is authenticated and adds the phone number to the profile associated with the user in the phone number list 207. In case the user selects the option to authenticate using a phone call, the phone based authentication system 124 calls the phone number input by the user and provides a voice prompt with the code. The phone based authentication system 124 presents a graphical user interface with a text entry region requesting that the user input the code that was spoken to the user during the phone call. The user inputs the code and the phone based authentication system 124 compares the code that was spoken to the user during the phone call with the code input by the user. In response to the phone based authentication system 124 determining that the codes match, the phone based authentication system 124 determines that the phone number is authenticated and adds the phone number to the profile associated with the user in the phone number list 207.

Application list 209 stores a list of all applications installed on a given client device 102. As new applications are installed on the given client device 102, the client device updates the application list 209 with the name and identity of the installed application. Application list 209 also stores a list of all the applications that are configured to share authentication information with the messaging client application 104 (e.g., applications that are connected with the messaging client application 104).

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
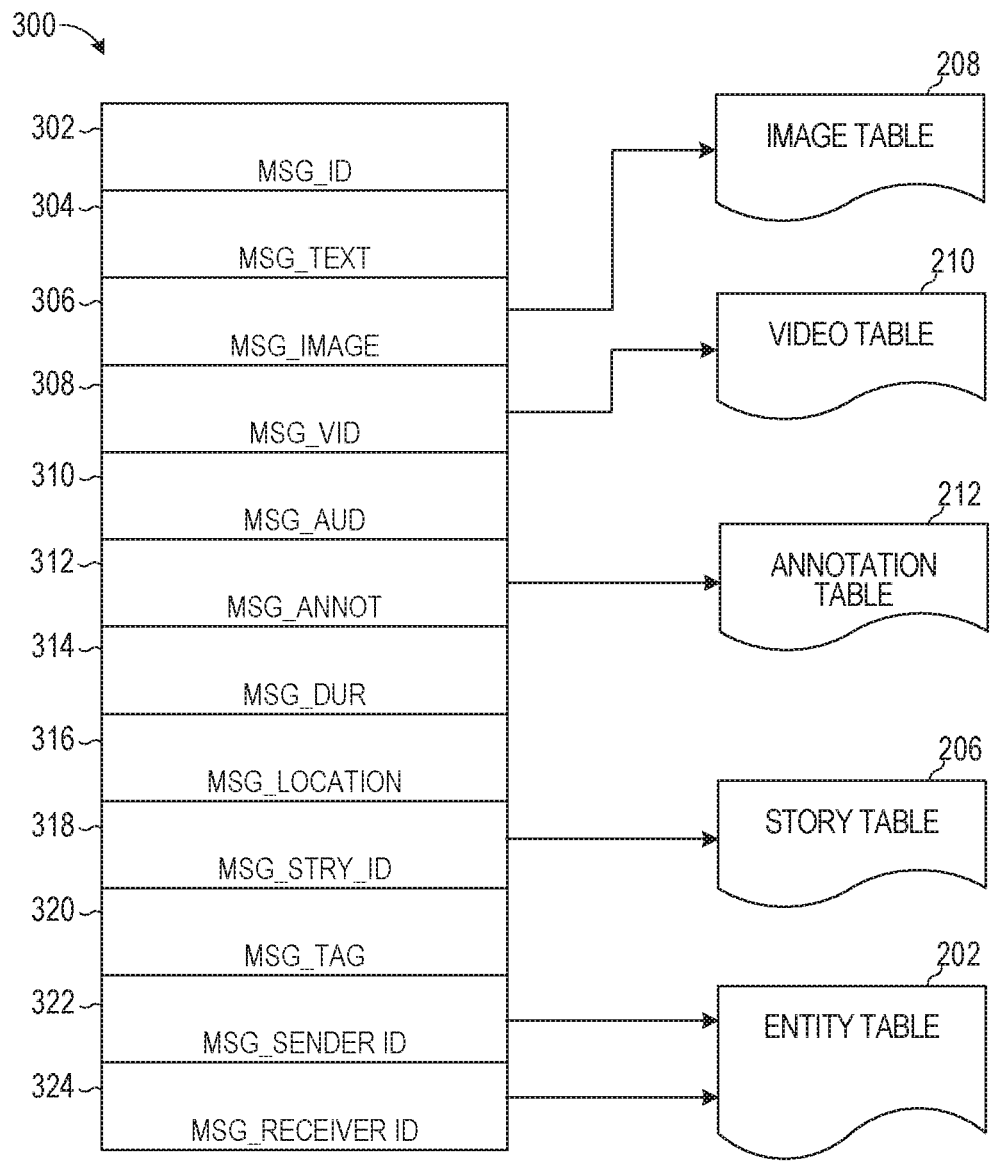
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

- A message identifier 302: a unique identifier that identifies the message 300.
- A message text payload 304: text, to be generated by a user via a UI of the client device 102 and that is included in the message 300.
- A message image payload 306: image data, captured by a camera component of a client device 102 or retrieved from memory of a client device 102, and that is included in the message 300.
- A message video payload 308: video data, captured by a camera component or retrieved from a memory component of the client device 102 and that is included in the message 300.
- A message audio payload 310: audio data, captured by a microphone or retrieved from the memory component of the client device 102, and that is included in the message 300.
- Message annotations 312: annotation data (e.g., filters, stickers, or other enhancements) that represents annotations to be applied to message image payload 306, message video payload 308, or message audio payload 310 of the message 300.
- A message duration parameter 314: parameter value indicating, in seconds, the amount of time for which content of the message (e.g., the message image payload 306, message video payload 308, message audio payload 310) is to be presented or made accessible to a user via the messaging client application 104.
- A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).
- A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
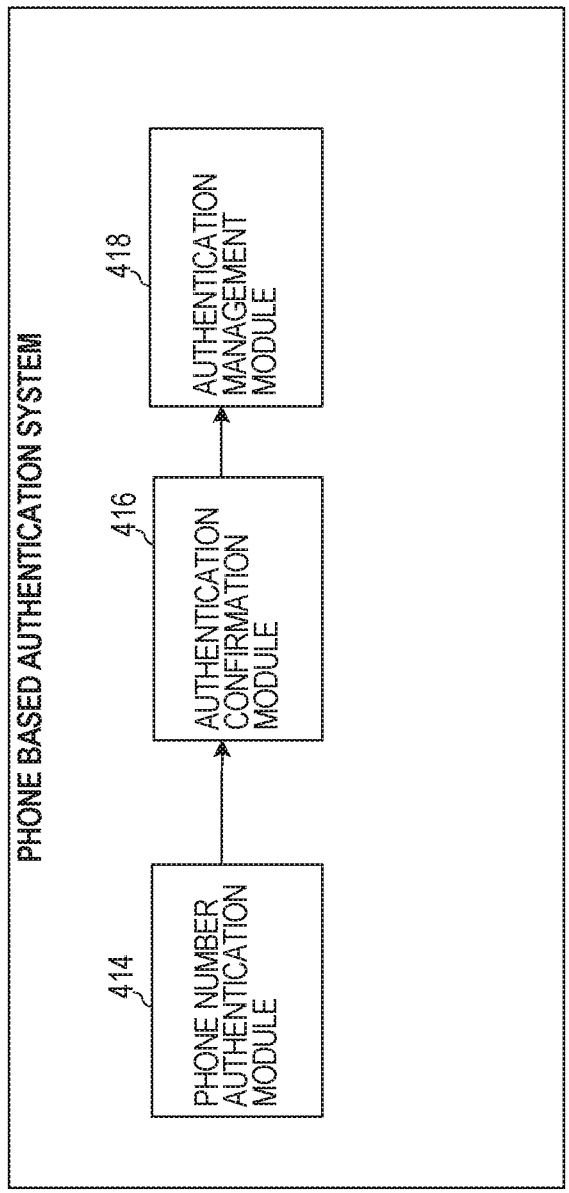
FIG. 4 is a block diagram showing an example phone based authentication system, according to example embodiments.

FIG. 4 is a block diagram showing an example phone based authentication system 124, according to example embodiments. Phone based authentication system 124 includes a phone number authentication module 414, an authentication confirmation module 416, and an authentication management module 418. The phone based authentication system 124 is configured to authenticate a phone number input by a user on a graphical user interface of a third-party application 105.

Specifically, the third-party application 105 generates a request to authenticate a phone number input by a user on a graphical user interface of the third-party application 105. This request is sent to the phone number authentication module 414 in response to receiving a user selection of an option on the graphical user interface of the third-party application 105 to authenticate the phone number with the messaging client application 104. The phone number authentication module 414 receives the request and retrieves from the request an identifier of the third-party application 105 and a name of the third-party application 105.

In some embodiments, to generate the request, the third-party application 105 presents a graphical user interface with an option that allows the user to register an account using just the user's phone number. In response to the user selecting the option to register the account using the phone number, the graphical user interface presents a text region for inputting a phone number. The text region may be country specific such that the number of phone number digits the user can input is based on the number of digits in a phone number in the specific country. In an embodiment, the phone number is prepopulated (populated in the text region without user input) by accessing local information of the client device 102. In an embodiment, a list of available phone numbers is presented to the user to select from and the phone number selected by the user is automatically populated into the text region. This reduces the number of keys the user has to press to add the phone number to the text region.

After the user inputs the phone number, the user can select between authenticating the phone number using a text message code or using the messaging client application 104. In some embodiments, the options for the user to select between authenticating the phone number using a text message code or using the messaging client application 104 are presented on the same graphical user interface as the text region for inputting the phone number and before the user inputs the phone number. In some embodiments, the options for the user to select between authenticating the phone number using a text message code or using the messaging client application 104 are presented as a prompt overlaying the graphical user interface used for inputting the phone number and after the user inputs the phone number and selects an option to continue. If the user selects to authenticate using the messaging client application 104, the third-party application 105 transmits the phone number to the phone number authentication module 414 with a request to authenticate the phone number. In some embodiments, the option to authenticate the phone number using the messaging application is excluded from display in response to the given application determining that the messaging application is not currently installed on the user device.

In some embodiments, in response to receiving the user selection to authenticate using the messaging client application 104, the third-party application 105 and/or the phone number authentication module 414 verify that the phone number in the text region is valid before authenticating the phone number.

In some embodiments, if the user selects the option to authenticate the phone number using the text message or phone call, the third-party application 105 authenticates the phone number without communicating with the messaging client application 104. In such circumstances, the third-party application 105 transmits a code via text message to the phone number input by the user. The third-party application 105 presents a graphical user interface with a text entry region requesting that the user input the code that was transmitted via text message to the phone number. The user inputs the code and the third-party application 105 compares the code that was transmitted via text message with the code input by the user. In response to the third-party application 105 determining that the codes match, the third-party application 105 determines that the phone number is authenticated and registers an account for the user with the third-party application 105. If the user selects the option to authenticate using a phone call, the third-party application 105 calls the phone number input by the user and provides a voice prompt with the code. The third-party application 105 presents a graphical user interface with a text entry region requesting that the user input the code that was spoken to the user during the phone call. The user inputs the code and the third-party application 105 compares the code that was spoken to the user during the phone call with the code input by the user. In response to the third-party application 105 determining that the codes match, the third-party application 105 determines that the phone number is authenticated and registers an account for the user with the third-party application 105.

In some embodiments, in response to receiving the request to authenticate the user or register an account for the user with the third-party application 105 using a phone number, the phone number authentication module 414 determines whether the user is currently logged into the messaging client application 104 locally on the client device 102. If the user is logged into the messaging application, the phone number authentication module 414 proceeds to determine whether the input phone number matches a phone number stored in the user account. Alternatively, if the user is not currently logged into the messaging client application 104, the phone number authentication module 414 stores the request to authenticate the user's phone number. The phone number authentication module 414 waits for the user to log into the messaging client application 104 until the user logs into the messaging application. Once the phone number authentication module 414 determines that the user has logged into the messaging client application 104 on the client device 102, the phone number authentication module 414 retrieves the request that has been stored and proceeds to authenticate the phone number included in the request.

The phone number authentication module 414 retrieves a unique identifier previously stored by the phone based authentication system 124 in association with the retrieved name of the third-party application 105. The phone number authentication module 414 compares the identifier received in the request with the retrieved unique identifier previously stored in association with the retrieved name of the third-party application 105. In response to determining that the identifiers match, the phone number authentication module 414 proceeds to authenticate the phone number transmitted in the request.

The phone number authentication module 414 retrieves the phone number received in the request from the third-party application 105. The phone number authentication module 414 accesses an account of the user logged into the messaging client application 104 to retrieve a phone number stored in the account. The phone number authentication module 414 compares the phone number stored in the account with the phone number received in the request. The phone number authentication module 414 determines whether the two numbers match. In response to determining that the two phone numbers match, the phone number authentication module 414 instructs the authentication confirmation module 416 to confirm that the phone number received in the request is authenticated and communicate such a message to the third-party application 105.

In some embodiments, the phone number authentication module 414 accesses the list of phone numbers stored in list 207 for all users of the messaging client application 104. The phone number authentication module 414 compares the phone numbers stored in the list of phone numbers stored in list 207 with the phone number received in the request. The phone number authentication module 414 determines whether the received phone number matches one of the numbers in the list 207. In response to determining that the received phone number matches one of the numbers in the list 207, the phone number authentication module 414 instructs the authentication confirmation module 416 to confirm that the phone number received in the request is authenticated and communicate such a message to the third-party application 105.

In some embodiments, the phone number authentication module 414 determines that the phone number received from the third-party application 105 fails to match a phone number stored in a user account. In response, the phone number authentication module 414 presents a prompt with an option for the user to add the phone number to the account stored by the phone number authentication module 414. In response to receiving a user selection of the option to add the phone number, the phone number authentication module 414 authenticates the phone number by transmitting a code via text message or phone call to the phone number and requesting that the user input the code via a graphical user interface of the messaging application. If the code input by the user via the graphical user interface matches the code transmitted by text message or phone call, the phone number is added to the account for the user with the messaging client application 104. If the code fails to match, then an error message is presented to the user with an option to resend the code and try again.

In some embodiments, the authentication confirmation module 416 presents a graphical user interface with a prompt indicating to the user that the phone number received in the request to authenticate the phone number has been found. Via the graphical user interface, the user can proceed to authorize the given application to register an account for the user. In some implementations, the authentication confirmation module 416 transmits a communication to the third-party application 105 indicating that the phone number is authenticated. In some implementations, the communication includes information that identifies the user, such as an avatar and/or name of the user. In some implementations, a user confirmation may be requested before the authentication confirmation module 416 shares the avatar and/or name of the user with the third-party application 105.

In some implementations, the authentication confirmation module 416 presents a graphical user interface with two options: a first option for just registering an account in the third-party application 105 based on the phone number that has been authenticated and a second option for allowing the user to register an account with the third-party application 105 and to connect the third-party application 105 with the messaging client application 104. In response to receiving a user selection of the first option, the authentication confirmation module 416 sends a communication back to the third-party application 105 indicating that the phone number has been found and authenticated. In some implementations, the authentication confirmation module 416 presents a graphical user interface with only the first option in response to determining that the third-party application 105 has already been connected with the messaging client application 104 in the past (e.g., before the user inputted the phone number into the third-party application 105 and selected the option to verify with the messaging client application 104). In some embodiments, the authentication confirmation module 416 presents the graphical user interface with options to verify and/or connect as a separate graphical user interface from the graphical user interface of the third-party application 105 used to input the phone number. In some embodiments, the authentication confirmation module 416 presents the graphical user interface with options to verify and/or connect as an overlay on top of the graphical user interface of the third-party application 105 used to input the phone number. In such cases, the overlay may be placed under the text region in which the phone number was input to allow the user to see the phone number that was input while also seeing the options provided by the authentication confirmation module 416.

In response to receiving a user selection of the second option to connect the third-party application 105 with the messaging client application 104, the authentication confirmation module 416 communicates with the authentication management module 418 to connect the third-party application 105 with the messaging client application 104. This provides the third-party application 105 with access to profile information, such as a user's avatar, a list of the user's friends, and media content items stored on the messaging application server. In an embodiment, the authentication management module 418 connects the third-party application 105 with the messaging client application 104 based on an OAUTH 2 authorization framework.

In some embodiments, the authentication management module 418 maintains a list of applications that have been connected with the messaging application. The user can request to display a list of the connected applications in the messaging application graphical user interface. In response to receiving such a request, the authentication management module 418 presents the list of third-party applications 105 that are connected with the messaging client application 104. In an embodiment, the authentication management module 418 determines which ones of the connected applications have an account registered using the phone number. The authentication management module 418 visually distinguishes applications in the list of connected applications for which an account was registered using the phone number from those for which an account was not registered using a phone number.

Figure 5:
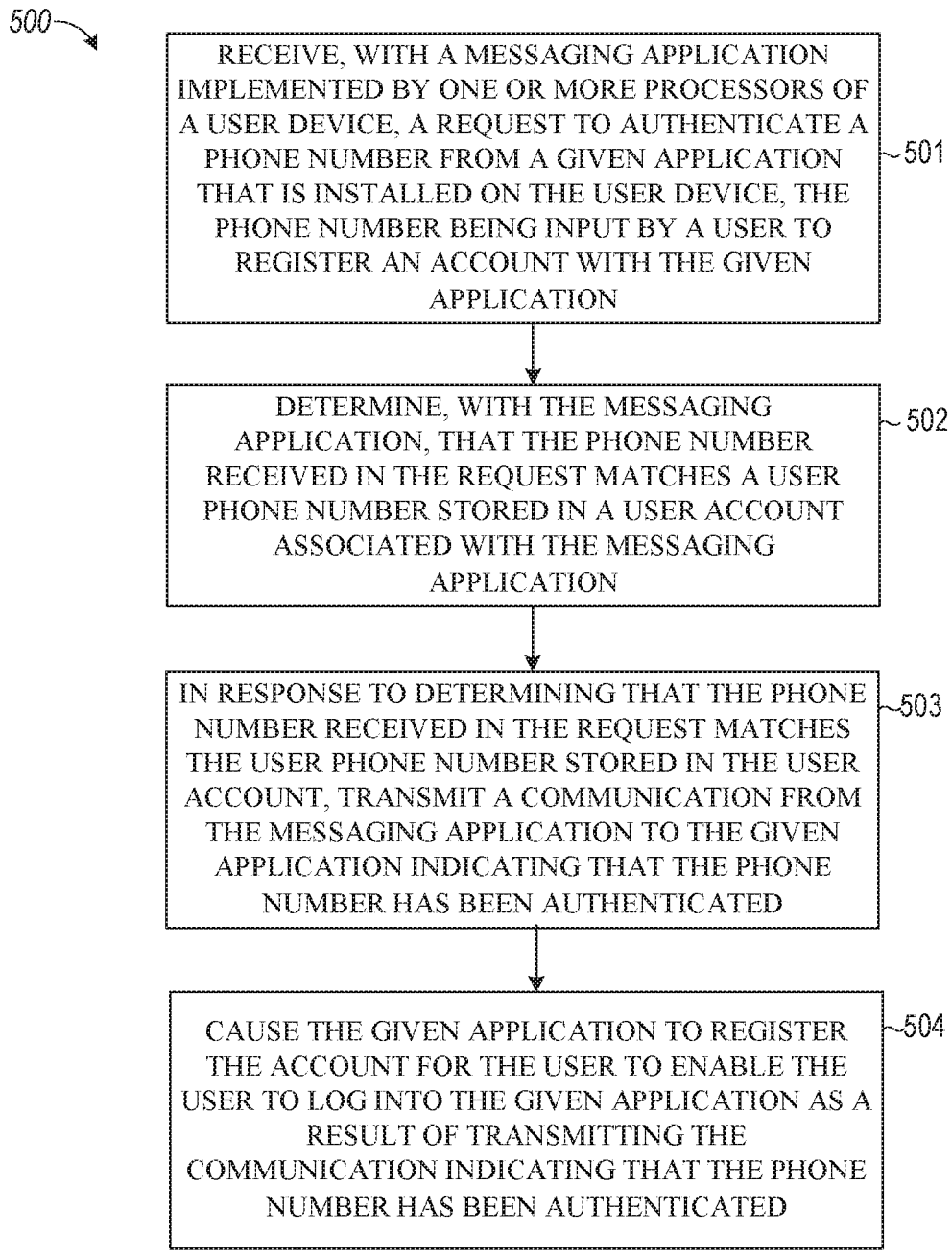
FIG. 5 is a flowchart illustrating example operations of the phone based authentication system, according to example embodiments.

FIG. 5 is a flowchart illustrating example operations of the phone based authentication system 124 in performing process 500, according to example embodiments. The process 500 may be embodied in computer-readable instructions for execution by one or more processors such that the operations of the process 500 may be performed in part or in whole by the functional components of the messaging server system 108 and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the phone based authentication system 124 receives, with a messaging application implemented by one or more processors of a user device, a request to authenticate a phone number from a given application that is installed on the user device, the phone number being input by a user to register an account with the given application.

At operation 502, the phone based authentication system 124 determines, with the messaging application, that the phone number received in the request matches a user phone number stored in a user account associated with the messaging application.

At operation 503, in response to determining that the phone number received in the request matches the user phone number stored in the user account, the phone based authentication system 124 transmits a communication from the messaging application to the given application indicating that the phone number has been authenticated.

At operation 504, the phone based authentication system 124 causes the given application to register the account for the user to enable the user to log into the given application as a result of transmitting the communication indicating that the phone number has been authenticated.

FIGS. 6A-F, 7A-C and 8 are illustrative inputs and outputs of the phone based authentication system 124, according to example embodiments. As shown in graphical user interface 610 (FIG. 6C), a welcome screen of the third-party application 105 is presented. The welcome screen includes an option 612 to create a new account. In response to receiving a user selection of the option 612 to create a new account, the third-party application 105 presents a graphical user interface 620 (FIG. 6A). Graphical user interface 620 includes a text entry region 622 for entering a user's phone number. In some embodiments, this text entry region 622 is presented in response to receiving a user request to create an account using a user's phone number.

In some embodiments, the third-party application 105 retrieves a user's phone number from a locally stored profile and presents the phone number in graphical user interface 620 as an option to populate text entry region 622. In response to receiving a user selection of the presented phone number, the third-party application 105 populates the text entry region 622 with the retrieved phone number. In some implementations, the user types in a phone number digit by digit into text entry region 622.

After the user types in a sufficient number of characters corresponding to a phone number in the user's country or region, a graphical user interface 630 (FIG. 6D) is presented. The graphical user interface 630 includes a first option 632 for authenticating the phone number input in region 622 using the messaging client application 104. The graphical user interface 630 includes a second option 634 to authenticate the phone number using a code sent to a text message or phone call.

In response to receiving a user selection of the first option 632, the third-party application 105 transmits a message to the messaging client application 104 including the phone number input in region 622. After receiving the message from the third-party application 105, the messaging client application 104 presents a graphical user interface 640 (FIG. 6E) indicating that the phone number has been authenticated in response to determining that the phone number matches a previously stored user's phone number. The graphical user interface 640 includes an option to continue, which, when selected by the user, causes the messaging client application 104 to transmit a message to the third-party application 105 indicating that the phone number has been authenticated.

Figure 7C:
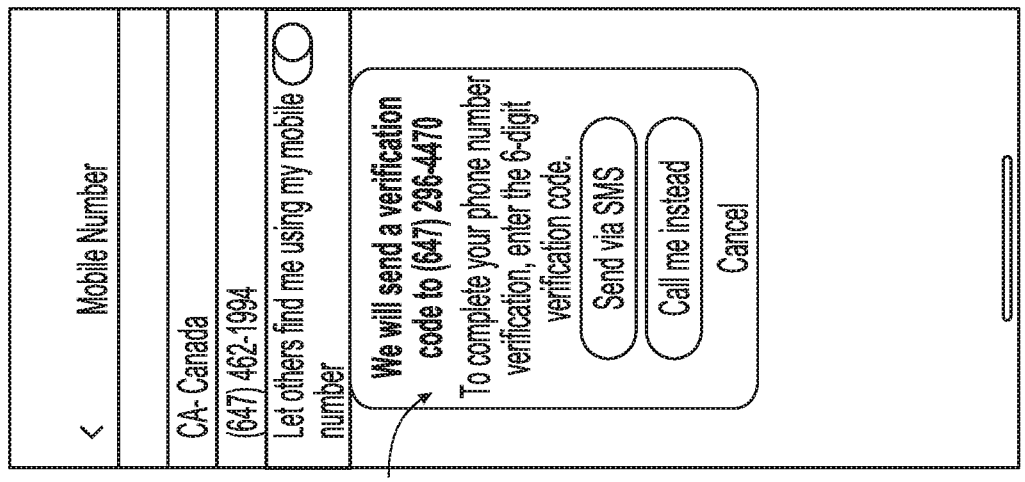
Figure 7B:
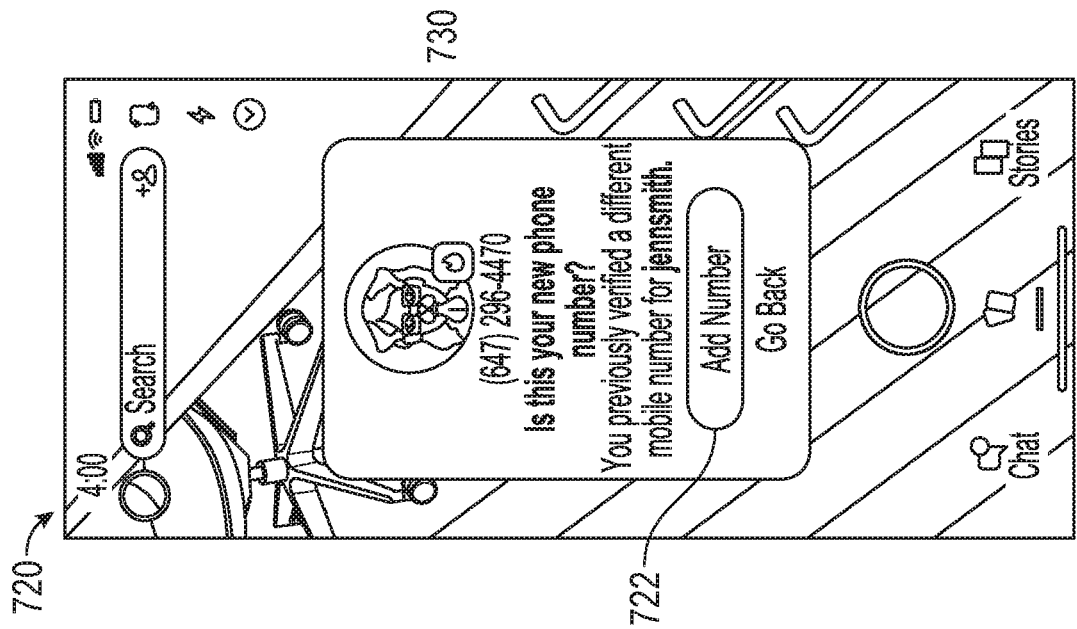
Figure 7A:
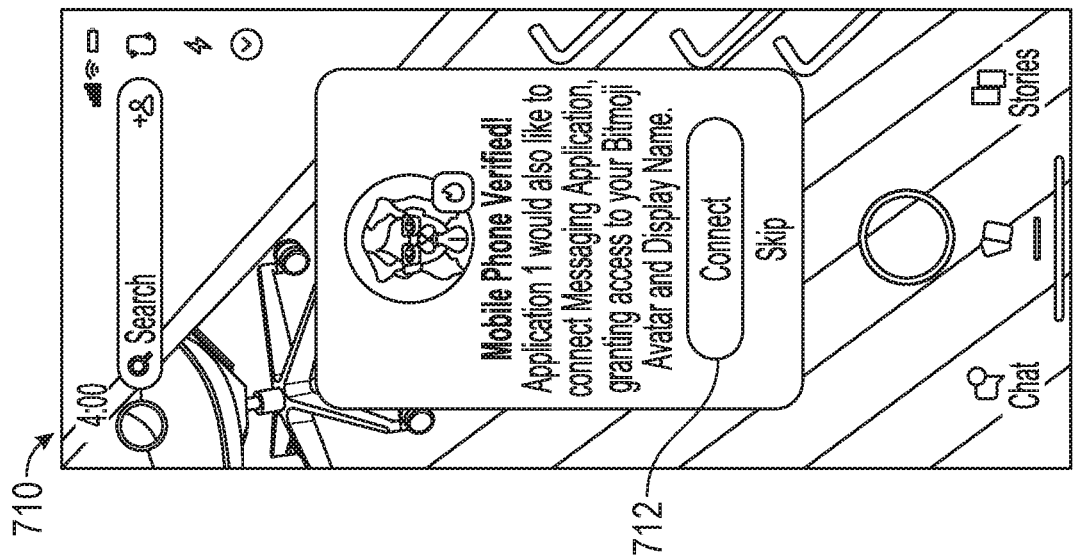

In some implementations, after receiving the message from the third-party application 105, the messaging client application 104 alternatively presents graphical user interface 710 (FIG. 7A). In this case, the graphical user interface 710 includes a connect option 712. In response to receiving a user selection of the connect option 712, the messaging client application 104 shares authentication information and profile information with the third-party application 105. In this case, after connecting the messaging client application 104 with the third-party application 105, the third-party application 105 is added to a connected applications list and a message is sent to the third-party application 105 indicating that the phone number is authenticated.

In some embodiments, after receiving the message from the third-party application 105, the messaging client application 104 presents a graphical user interface 720 (FIG. 7B) in response to determining that the phone number fails to match a previously stored user's phone number. In this case, graphical user interface 720 includes an option 722 to add the phone number to the user's account with the messaging client application 104. In response to receiving a user selection of option 722, the messaging client application 104 presents a prompt 730 (FIG. 7C) with options for confirming or verifying the phone number that was received from the third-party application 105. A first option includes a verification technique in which a code is sent to the user via a text message and a second option sends the code via a phone call. After the user successfully inputs the code sent to the user in a graphical user interface, the messaging client application 104 verifies the phone number and adds the phone number to the user's account. In addition, the messaging client application 104 sends a message to the third-party application 105 indicating that the phone number has been authenticated. In this way, rather than verifying the phone number by text message or phone call through the graphical user interface of the third-party application 105, the phone number is verified directly by the messaging client application 104.

Referring back to FIG. 6, after the third-party application 105 receives the message from the messaging client application 104 indicating that the phone number is authenticated, the third-party application 105 presents a graphical user interface 660. Graphical user interface 660 indicates that the third-party application 105 is logging the user in to access features of the third-party application 105 based on the authenticated phone number input by the user. When the user exits the third-party application 105 and launches the third-party application 105 at a later time again, the third-party application 105 automatically logs the user in based on the previously supplied and authenticated phone number and without requesting that the user provide login credentials (e.g., a username and password).

In some embodiments, in response to receiving a user selection of the second option 634, the third-party application 105 sends a code to the phone number input in region 622 via text message. The third-party application 105 presents a graphical user interface 650 (FIG. 6B) with an input region for entering the code sent to the phone number. After the user successfully enters a code into the region of graphical user interface 650 that matches the code sent to the user, the phone number is verified by the third-party application 105 and the user is presented with graphical user interface 660 (FIG. 6F). Instead of entering the code sent to the user via text message in graphical user interface 650, the user can select a verify with messaging client application option 652. In response to selecting option 652, the third-party application 105 sends the phone number entered in region 622 to the messaging client application 104 for verification and authentication.

Figure 8:
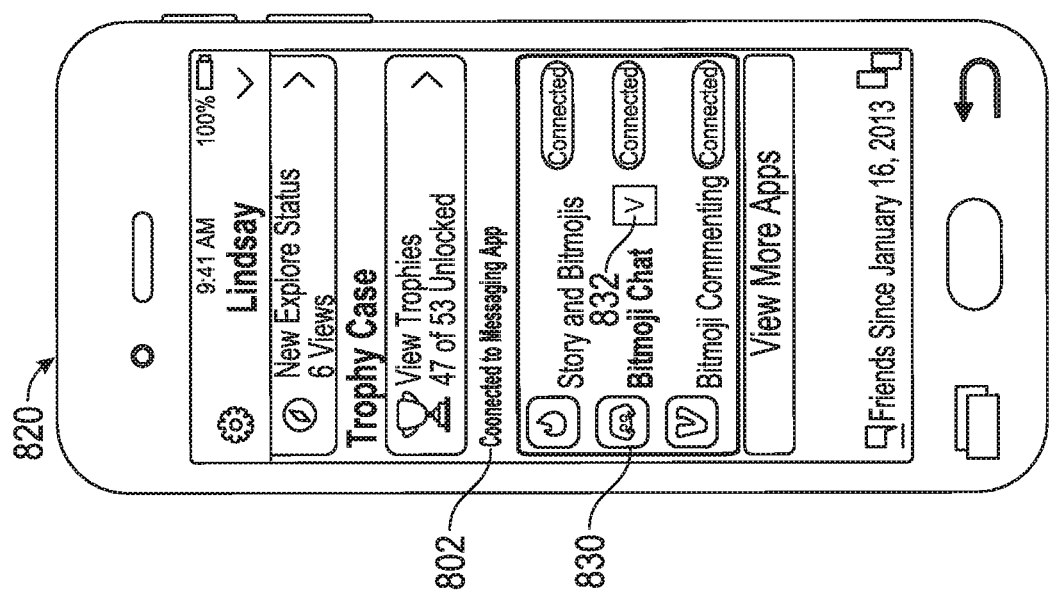

Graphical user interface 820 of FIG. 8 of the messaging client application 104 presents a list of third-party applications 105 that have been installed on the client device 102 and connected to the messaging client application 104. Such applications are listed in region 802. The messaging client application 104 visually distinguishes applications listed in region 802 which have been registered or authorized using a phone number from those which have not. For example, a given application 830 is presented with different style text from other applications listed in region 802 in response to determining that the given application 830 has been registered using the user's phone number. Alternatively or in addition, an indicator 832 may be presented together with the name of the given application 830 to indicate that that the given application 830 has been registered using the user's phone number.

Figure 9:
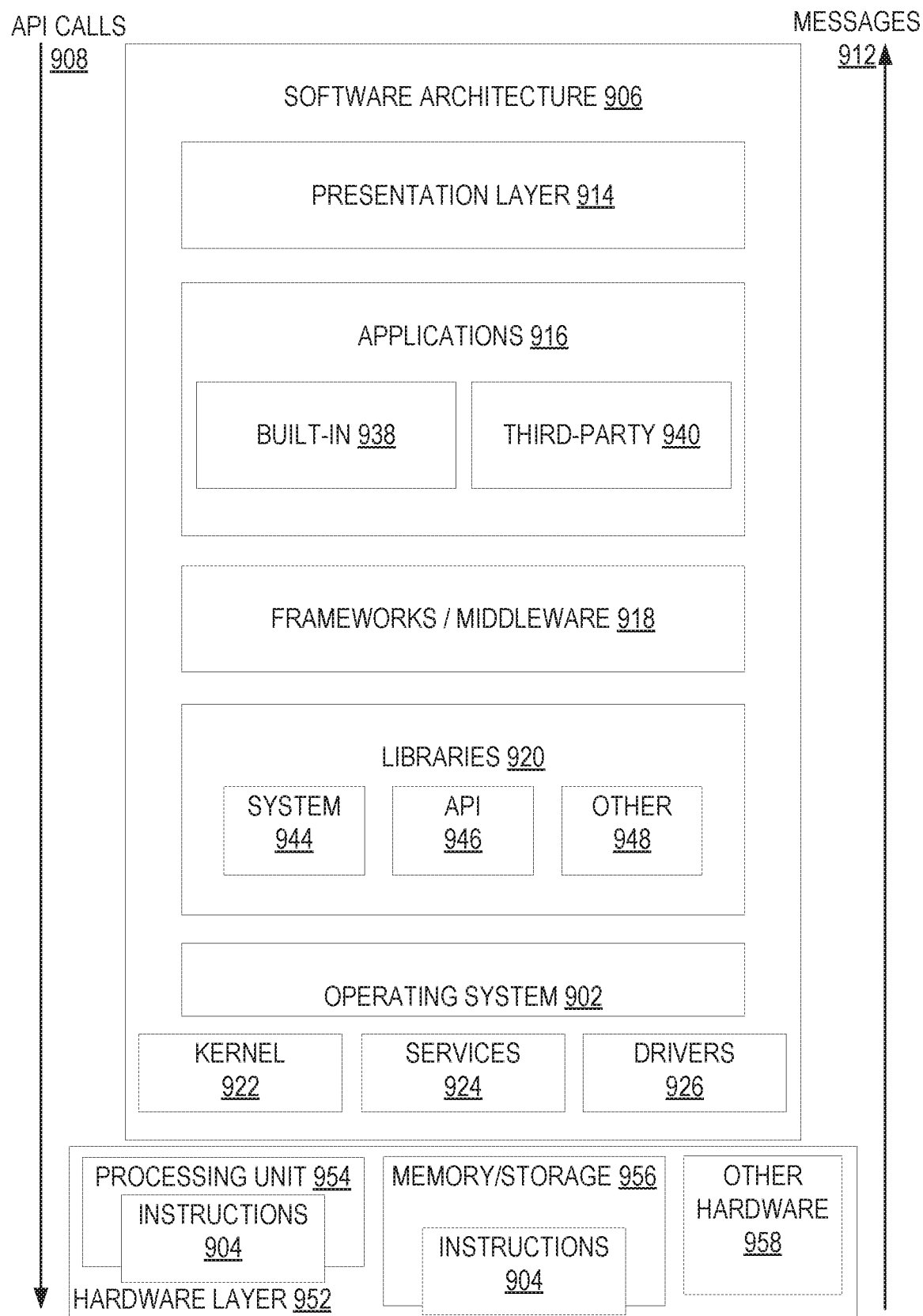
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
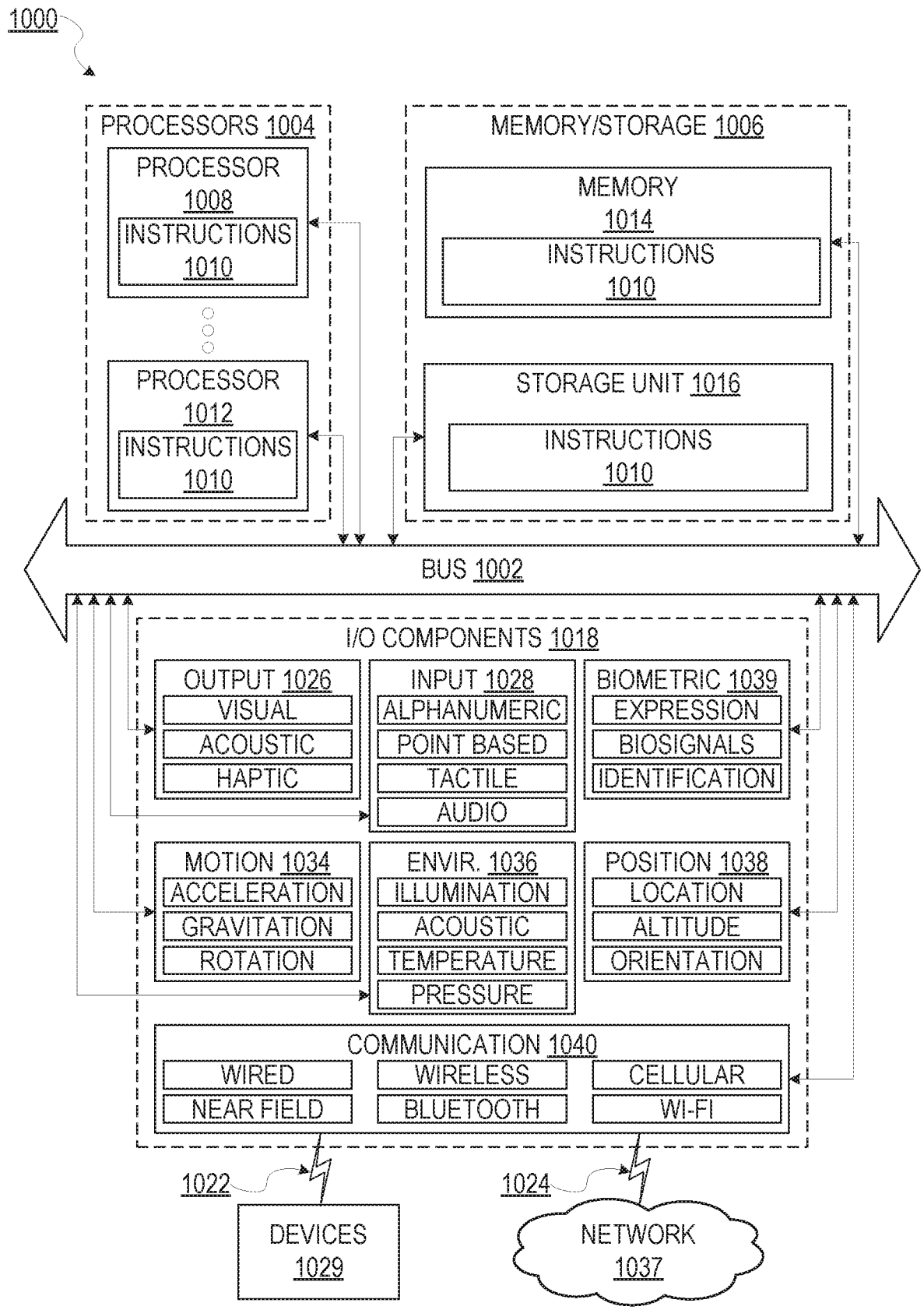
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
receiving, with a messaging application implemented by one or more processors of a user device, a request to authenticate a phone number from a given application that is installed on the user device, the phone number being input by a user to register an account with the given application;
determining, with the messaging application, that the phone number received in the request fails to match a user phone number of the user account associated with the messaging application;
in response to determining that the phone number received in the request fails to match the user phone number, generating for display an option to add the phone number to the account associated with the messaging application;
after adding the phone number to the account, determining, with the messaging application, that the phone number received in the request matches the user phone number;
in response to determining that the phone number received in the request matches the user phone number, transmitting a communication from the messaging application to the given application indicating that the phone number has been authenticated; and
causing the given application to register the account for the user to enable the user to log into the given application as a result of transmitting the communication indicating that the phone number has been authenticated.

2. The method of claim 1, further comprising:
in response to determining that the phone number received in the request matches the user phone number, generating for display, within a graphical user interface of the messaging application, a prompt indicating that the phone number received in the request has been found.

3. The method of claim 1, further comprising:
in response to receiving the request, determining that the user is currently logged into the messaging application, wherein determining that the phone number received in the request matches the user phone number is performed in response to determining that the user is currently logged into the messaging application.

4. The method of claim 1, further comprising:
receiving a user request to launch the given application;
in response to receiving the user request to launch the given application, determining that the user currently does not have an account with the given application;
generating, for display with the given application, a graphical user interface with a text region for inputting the phone number;
generating, for display in the graphical user interface of the given application, a first option to authenticate the phone number with the messaging application; and
transmitting the request to the messaging application in response to receiving a user selection of the first option to authenticate the phone number with the messaging application.

5. The method of claim 4, further comprising:
generating for display, simultaneously with the first option, in the graphical user interface of the given application, a second option to authenticate the phone number via text message transmission of a code; and
registering the user with the given application in response to receiving a user selection of the second option and in response to receiving the code transmitted to the user via the text message.

6. The method of claim 1, wherein the user is enabled to log into the given application without entering a password.

7. The method of claim 1, further comprising:
in response to receiving the request, determining that the user is currently not logged into the messaging application; and
in response to determining that the user is currently not logged into the messaging application, storing the request until the user logs into the messaging application, wherein determining that the phone number received in the request matches the user phone number is performed after the user logs into the messaging application.

8. The method of claim 1, further comprising:
in response to determining that the phone number received in the request matches the user phone number, generating for display, within a graphical user interface of the messaging application, a prompt with an option to connect the messaging application with the given application, wherein connecting the messaging application with the given application provides the given application with access to profile information associated with the messaging application.

9. The method of claim 1, wherein:
the messaging application is provided by a first entity or organization; and
the given application is provided by a second entity or organization different from the first entity or organization.

10. The method of claim 1, wherein the given application is configured to share authentication information with the messaging application based on an OAuth 2 authorization framework.

11. The method of claim 1, further comprising:
determining with the given application whether the messaging application is currently installed on the user device; and
in response to determining that the messaging application is not currently installed on the user device, excluding display of an option to authenticate the phone number with the messaging application.

12. The method of claim 1, further comprising in response to receiving a user selection of the option to add the phone number, verifying the phone number via a text message code or a phone call.

13. The method of claim 1, further comprising transmitting an avatar of the user stored with the messaging application to the given application in response to determining that the phone number received in the request matches the user phone number stored in the user account.

14. The method of claim 13, further comprising requesting authorization from the user to transmit the avatar to the given application.

15. The method of claim 1, further comprising:
displaying with the messaging application a list of applications that have been connected with the messaging application; and
visually distinguishing a first set of applications on the list of applications which have been verified with the phone number from a second set of applications on the list of applications that have not been verified with the phone number.

16. The method of claim 1, further comprising:
extracting an application identifier from the request with the messaging application; and
verifying authenticity of the given application by comparing the application identifier with a corresponding application identifier stored by the messaging application.

17. A system comprising:
a processor configured to perform operations comprising:
receiving, with a messaging application implemented on a user device, a request to authenticate a phone number from a given application that is installed on the user device, the phone number being input by a user to register an account with the given application;
determining, with the messaging application, that the phone number received in the request fails to match a user phone number of the user account associated with the messaging application;
in response to determining that the phone number received in the request fails to match the user phone number, generating for display an option to add the phone number to the account associated with the messaging application;
after adding the phone number to the account, determining, with the messaging application, that the phone number received in the request matches the user phone number;
in response to determining that the phone number received in the request matches the user phone number, transmitting a communication from the messaging application to the given application indicating that the phone number has been authenticated; and
causing the given application to register the account for the user to enable the user to log into the given application as a result of transmitting the communication indicating that the phone number has been authenticated.

18. The system of claim 17, wherein the operations further comprise:
in response to receiving the request, determining that the user is currently not logged into the messaging application; and
in response to determining that the user is currently not logged into the messaging application, storing the request until the user logs into the messaging application, wherein determining that the phone number received in the request matches the user phone number is performed after the user logs into the messaging application.

19. The system of claim 17, wherein the operations further comprise:
in response to determining that the phone number received in the request matches the user phone number, generating for display, within a graphical user interface of the messaging application, a prompt indicating that the phone number received in the request has been found.

20. A non-transitory machine-readable storage medium that includes instructions that, when executed by one or more processors of a machine, cause the machine to perform operations comprising:
receiving, with a messaging application implemented on a user device, a request to authenticate a phone number from a given application that is installed on the user device, the phone number being input by a user to register an account with the given application;
determining, with the messaging application, that the phone number received in the request fails to match a user phone number of the user account associated with the messaging application;
in response to determining that the phone number received in the request fails to match the user phone number, generating for display an option to add the phone number to the account associated with the messaging application;
after adding the phone number to the account, determining, with the messaging application, that the phone number received in the request matches the user phone number;
in response to determining that the phone number received in the request matches the user phone number, transmitting a communication from the messaging application to the given application indicating that the phone number has been authenticated; and
causing the given application to register the account for the user to enable the user to log into the given application as a result of transmitting the communication indicating that the phone number has been authenticated.

* * * * *